United States Patent
Hagaribommanahalli et al.

(10) Patent No.: US 11,753,028 B1
(45) Date of Patent: Sep. 12, 2023

(54) PEDAL CONTROL SYSTEM AND METHOD FOR AN ELECTRIC VEHICLE

(71) Applicant: NISSAN NORTH AMERICA, INC., Franklin, TN (US)

(72) Inventors: Sachin Hagaribommanahalli, Santa Clara, CA (US); Christopher Ostafew, Mountain View, CA (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/900,757

(22) Filed: Aug. 31, 2022

(51) Int. Cl.
*B60W 50/10* (2012.01)
*B60K 26/04* (2006.01)
*B60K 26/02* (2006.01)
*B60W 50/08* (2020.01)
*B60W 50/00* (2006.01)
*B60W 40/09* (2012.01)

(52) U.S. Cl.
CPC ............ *B60W 50/10* (2013.01); *B60K 26/02* (2013.01); *B60K 26/04* (2013.01); *B60W 50/085* (2013.01); *B60K 2026/025* (2013.01); *B60K 2026/026* (2013.01); *B60T 2220/02* (2013.01); *B60T 2220/06* (2013.01); *B60W 40/09* (2013.01); *B60W 2050/0083* (2013.01); *B60W 2540/10* (2013.01); *B60W 2540/106* (2013.01); *B60W 2540/12* (2013.01)

(58) Field of Classification Search
None
See application file for complete search history.

(56) References Cited

U.S. PATENT DOCUMENTS

| | | | |
|---|---|---|---|
| 7,805,232 B2 * | 9/2010 | Karnjate | B60T 7/042 303/121 |
| 8,565,992 B2 * | 10/2013 | Fuchs | B60L 7/24 701/22 |
| 9,045,136 B2 * | 6/2015 | Frank | B60W 20/10 |
| 9,145,134 B2 * | 9/2015 | Park | B60W 10/06 |
| 9,193,343 B2 * | 11/2015 | Jung | B60T 13/662 |
| 9,266,445 B2 * | 2/2016 | Dastoor | B60L 50/51 |
| 9,399,406 B2 * | 7/2016 | Dastoor | B60L 58/12 |
| 9,849,869 B2 * | 12/2017 | Frank | B60W 10/10 |
| 10,384,667 B2 * | 8/2019 | Frank | B60W 30/182 |
| 10,946,895 B2 * | 3/2021 | Inoue | B62D 5/006 |
| 11,077,769 B2 * | 8/2021 | Dastoor | B60L 58/30 |
| 11,084,396 B2 * | 8/2021 | Dastoor | B60L 50/52 |
| 11,150,623 B2 * | 10/2021 | Jiang | G05B 19/048 |
| 2008/0306667 A1 * | 12/2008 | Karnjate | B60T 7/042 303/121 |

(Continued)

FOREIGN PATENT DOCUMENTS

| | | | | |
|---|---|---|---|---|
| CA | 3067955 A1 * | 12/2018 | ............ | B60W 10/02 |
| CN | 101434202 B * | 3/2012 | ............ | B60K 6/365 |

(Continued)

*Primary Examiner* — Kevin R Steckbauer
(74) *Attorney, Agent, or Firm* — Global IP Counselors, LLP

(57) ABSTRACT

A method of controlling an electric vehicle includes operating the vehicle in accordance with a current pedal map. A plurality of alternative pedal maps is defined. A variance for each of the plurality of alternative pedal maps is determined. Operation of the vehicle is switched from the current pedal map to one of the alternative pedal maps based on the determined variance.

20 Claims, 6 Drawing Sheets

(56) References Cited

U.S. PATENT DOCUMENTS

| | | | | |
|---|---|---|---|---|
| 2009/0125199 | A1* | 5/2009 | Kaigawa | B60W 10/06 |
| | | | | 701/54 |
| 2010/0191432 | A1* | 7/2010 | Fuchs | B60L 7/24 |
| | | | | 701/70 |
| 2012/0227616 | A1* | 9/2012 | Kusano | B60L 7/18 |
| | | | | 105/61 |
| 2013/0166182 | A1* | 6/2013 | Suzuki | B60W 10/02 |
| | | | | 701/110 |
| 2014/0100730 | A1* | 4/2014 | Park | B60W 20/20 |
| | | | | 903/903 |
| 2014/0136069 | A1* | 5/2014 | Jung | B60T 13/662 |
| | | | | 701/70 |
| 2014/0229043 | A1* | 8/2014 | Frank | B60W 10/02 |
| | | | | 180/65.23 |
| 2014/0277888 | A1* | 9/2014 | Dastoor | B60L 3/12 |
| | | | | 701/22 |
| 2015/0232082 | A1* | 8/2015 | Frank | B60W 30/182 |
| | | | | 180/65.265 |
| 2016/0121756 | A1* | 5/2016 | Dastoor | B60L 1/00 |
| | | | | 701/22 |
| 2016/0303997 | A1* | 10/2016 | Dastoor | B60L 1/00 |
| 2017/0259697 | A1* | 9/2017 | Dastoor | B60L 1/00 |
| 2018/0118187 | A1* | 5/2018 | Frank | B60W 20/20 |
| 2019/0300051 | A1* | 10/2019 | Inoue | B60T 7/042 |
| 2020/0148063 | A1* | 5/2020 | Dastoor | B60L 50/51 |
| 2020/0409326 | A1* | 12/2020 | Jiang | G06N 20/00 |
| 2021/0362621 | A1* | 11/2021 | Dastoor | B60L 15/2045 |

FOREIGN PATENT DOCUMENTS

| | | | | | |
|---|---|---|---|---|---|
| CN | 107539306 | A | * | 1/2018 | |
| CN | 108340787 | A | * | 7/2018 | B60K 26/02 |
| CN | 108340787 | B | * | 8/2021 | B60K 26/02 |
| DE | 102013109187 | A1 | * | 5/2014 | B60T 13/662 |
| DE | 102021210226 | A1 | * | 3/2023 | |
| EP | 2666689 | A1 | * | 11/2013 | B60K 6/48 |
| EP | 3549845 | A1 | * | 10/2019 | B60K 26/02 |
| EP | 2019761 | B1 | * | 4/2021 | B60L 7/06 |
| EP | 3549845 | B1 | * | 6/2021 | B60K 26/02 |
| ES | 2876192 | T3 | * | 11/2021 | B60L 7/06 |
| JP | 2012171436 | A | * | 9/2012 | B60T 13/662 |
| JP | 5059246 | B2 | * | 10/2012 | B60K 6/48 |
| JP | 5803133 | B2 | * | 11/2015 | B60T 13/662 |
| JP | 2021130367 | A | * | 9/2021 | |
| WO | WO-2006114681 | A2 | * | 11/2006 | B60W 10/04 |
| WO | WO-2012098743 | A1 | * | 7/2012 | B60K 6/48 |
| WO | WO-2014123784 | A1 | * | 8/2014 | B60K 6/26 |
| WO | WO-2014152951 | A1 | * | 9/2014 | B60L 1/00 |

\* cited by examiner

PEDAL CONTROL SYSTEM AND METHOD FOR AN ELECTRIC VEHICLE

BACKGROUND

Technical Field

The present disclosure generally relates to a system and method of controlling a pedal of an electric vehicle. More specifically, the present disclosure relates to switching a pedal map that controls acceleration and braking of the electric vehicle in accordance with operation of the pedal.

Background Information

One-pedal functionality in vehicles allows a driver to drive without using a brake pedal. The driver regulates relatively large deceleration rates using only an accelerator pedal. However, the vehicle can decelerate too much when the driver releases the accelerator pedal, such as when cruising on a highway. Increased attention of the driver is required to carefully regulate the speed of the vehicle. The vehicle can also not decelerate quickly enough when the driver releases the accelerator pedal, such as when a vehicle ahead begins to decelerate rapidly. A stress level of the driver is increased in these situations.

SUMMARY

A need exists for a pedal control system and method for an electric vehicle.

In view of the state of the known technology, one aspect of the present disclosure is to provide a method of controlling an electric vehicle. The vehicle is operated in accordance with a current pedal map. A plurality of alternative pedal maps is defined. A variance for each of the plurality of alternative pedal maps is determined. Operation of the vehicle is switched from the current pedal map to one of the alternative pedal maps based on the determined variance.

Another aspect of the present disclosure is to provide a system a pedal control system for an electric vehicle. The pedal control system includes a pedal, a memory, and an electronic controller. The pedal is configured to control acceleration and braking of the vehicle. The memory is configured to store a current pedal map. The electronic controller is configured to output a torque request based on a vehicle speed, an accelerator pedal output of the pedal, and the current pedal map. The electronic controller is further configured to define a plurality of alternative pedal maps, determine a variance for each of the plurality of alternative pedal maps; and switch operation of the vehicle from the current pedal map to one of the alternative pedal maps based on the determined variance.

Also other objects, features, aspects and advantages of the disclosed pedal control system and method for an electric vehicle will become apparent to those skilled in the art from the following detailed description, which, taken in conjunction with the annexed drawings, discloses exemplary embodiments of the pedal control system and method for an electric vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Although described herein with reference to an electric vehicle, the methods and apparatus described herein may be implemented in any vehicle capable of one-pedal operation.

Figure 1:
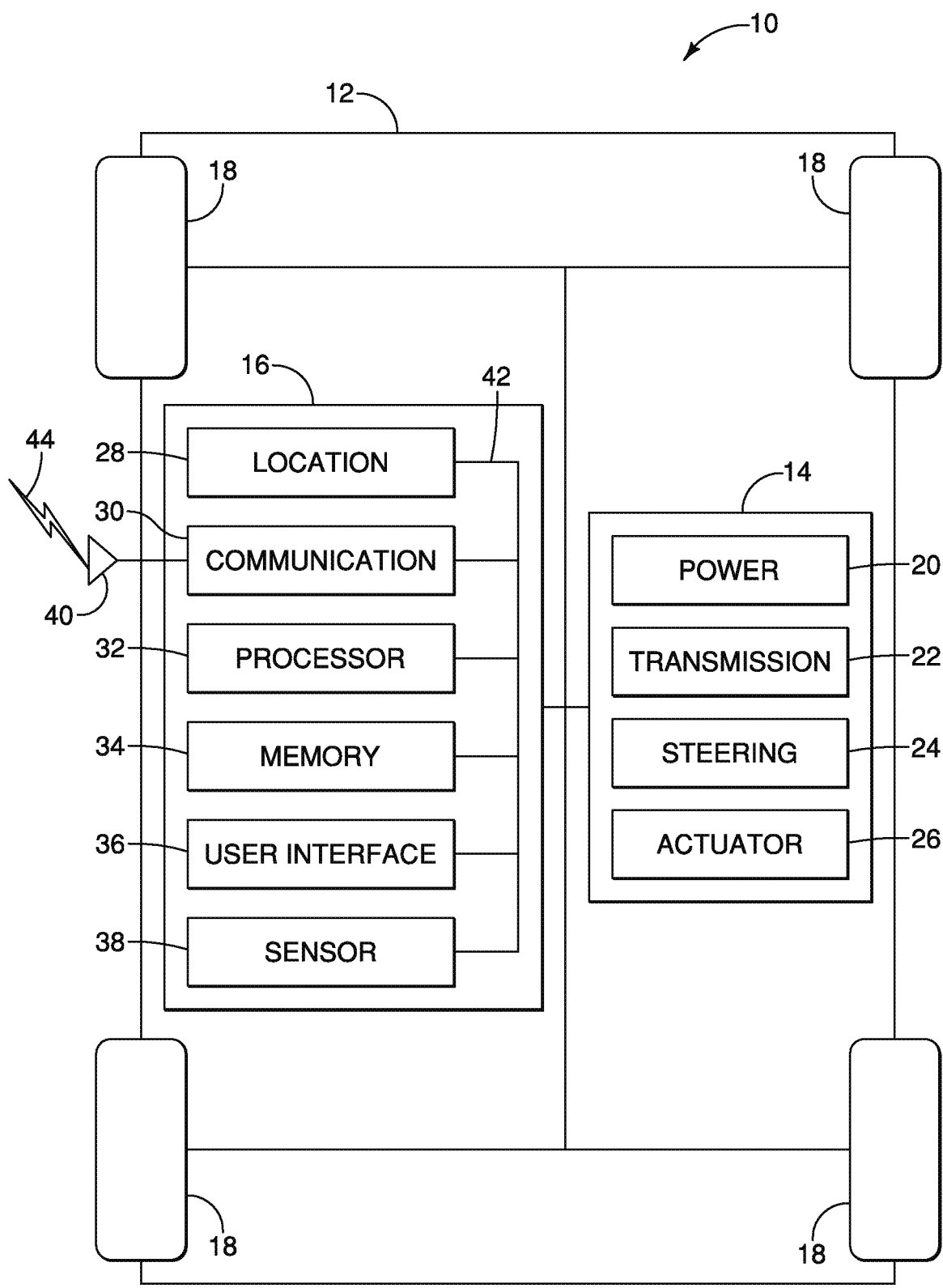
FIG. 1 is a diagram of an example of a vehicle in accordance with an exemplary embodiment.

FIG. 1 is a diagram of an example of an electric vehicle in accordance with an exemplary embodiment in which the features, and elements disclosed herein may be implemented. As shown, a vehicle 10 includes a chassis 12, a powertrain 14, a controller 16, and wheels 18. Although the vehicle 10 is shown as including four wheels 18 for simplicity, any other propulsion device or devices, such as a propeller or tread, may be used. In FIG. 1, the lines interconnecting elements, such as the powertrain 12, the controller 16, and the wheels 18, indicate that information, such as data or control signals, power, such as electrical power or torque, or both information and power, may be communicated between the respective elements. For example, the controller 16 may receive power from the powertrain 14 and may communicate with the powertrain 14, the wheels 18, or both, to control the vehicle 10, which may include accelerating, decelerating, steering, or otherwise controlling the vehicle 10.

As shown, the powertrain 14 includes a power source 20, a transmission 22, a steering unit 24, and an actuator 26. Other elements or combinations of elements of a powertrain, such as a suspension, a drive shaft, axles, or an exhaust system may be included. Although shown separately, the wheels 18 may be included in the powertrain 14.

The power source 20 may include an engine, a battery, or a combination thereof. The power source 20 may be any device or combination of devices operative to provide energy, such as electrical energy, thermal energy, or kinetic energy. For example, the power source 20 may include an engine, such as an internal combustion engine, an electric motor, or a combination of an internal combustion engine and an electric motor, and may be operative to provide kinetic energy as a motive force to one or more of the wheels 18. The power source 20 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 22 may receive energy, such as kinetic energy, from the power source 20, and may transmit the energy to the wheels 18 to provide a motive force. The transmission 22 may be controlled by the controller 16, the actuator 26, or both. The steering unit 24 may be controlled by the controller 16, the actuator 26, or both, and may control the wheels 18 to steer the vehicle 10. The actuator 26 may receive signals from the controller 16 and may actuate or control the power source 20, the transmission 22, the steering unit 24, or any combination thereof to operate the vehicle 10.

As shown, the controller 16 may include a location unit 28, an electronic communication unit 30, a processor 32, a memory 34, a user interface 36, a sensor 38, an electronic communication interface 40, or any combination thereof. Although shown as a single unit, any one or more elements of the controller 16 may be integrated into any number of separate physical units. For example, the user interface 36 and the processor 32 may be integrated in a first physical unit and the memory 34 may be integrated in a second physical unit. Although not shown in FIG. 1, the controller 16 may include a power source, such as a battery. Although shown as separate elements, the location unit 28, the electronic communication unit 30, the processor 32, the memory 34, the user interface 36, the sensor 38, the electronic communication interface 40, or any combination thereof may be integrated in one or more electronic units, circuits, or chips.

The processor 32 may include any device or combination of devices capable of manipulating or processing a signal or other information now-existing or hereafter developed, including optical processors, quantum processors, molecular processors, or a combination thereof. For example, the processor 32 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 32 may be operatively coupled with the location unit 28, the memory 34, the electronic communication interface 40, the electronic communication unit 30, the user interface 36, the sensor 38, the powertrain 14, or any combination thereof. For example, the processor may be operatively coupled with the memory 34 via a communication bus 42.

The memory 34 may include any tangible non-transitory computer-usable or computer-readable medium, capable of, for example, containing, storing, communicating, or transporting machine readable instructions, or any information associated therewith, for use by or in connection with the processor 32. The memory 34 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 40 may be a wireless antenna, as shown, a wired communication port, an optical communication port, or any other wired or wireless unit capable of interfacing with a wired or wireless electronic communication medium 44. Although FIG. 1 shows the communication interface 40 communicating via a single communication link, a communication interface may be configured to communicate via multiple communication links. Although FIG. 1 shows a single communication interface 40, a vehicle may include any number of communication interfaces.

The communication unit 30 may be configured to transmit or receive signals via a wired or wireless electronic communication medium 44, such as via the communication interface 40. Although not explicitly shown in FIG. 1, the communication unit 30 may be configured to transmit, receive, or both via any wired or wireless communication medium, such as radio frequency (RF), ultraviolet (UV), visible light, fiber optic, wireline, or a combination thereof. Although FIG. 1 shows a single communication unit 30 and a single communication interface 40, any number of communication units and any number of communication interfaces may be used. In some embodiments, the communication unit 30 may include a dedicated short-range communications (DSRC) unit, an on-board unit (OBU), or a combination thereof.

The location unit 28 may determine geolocation information, such as longitude latitude, elevation, direction of travel, or speed, of the vehicle 10. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 28 can be used to obtain information that represents, for example, a current heading of the vehicle 10, a current position of the vehicle 10 in two or three dimensions, a current angular orientation of the vehicle 10, or a combination thereof.

The user interface 36 may include any unit capable of interfacing with a person such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 36 may be operatively coupled with the processor 32, as shown, or with any other element of the controller 16. Although shown as a single unit, the user interface 36 may include one or more physical units. For example, the user interface 36 may include an audio interface for performing audio communication with a person and a touch display for performing visual and touch-based communication with the person. The user interface 36 may include multiple displays, such as multiple physically separate units, multiple defined portions within a single physical unit, or a combination thereof.

The sensor 38 may include one or more sensors, such as an array of sensors, which may be operable to provide information that may be used to control the vehicle. The sensors 38 may provide information regarding current operating characteristics of the vehicle 10. The sensor 38 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 10.

The sensor 38 may include one or more sensors operable to obtain information regarding the physical environment surrounding the vehicle 10. For example, one or more sensors may detect road geometry and features, such as lane lines, and obstacles, such as fixed obstacles, vehicles, and pedestrians. The sensor 38 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 38 and the location unit 28 may be a combined unit.

Although not shown separately, the vehicle 10 may include a trajectory controller. For example, the controller 16 may include the trajectory controller. The trajectory controller may be operable to obtain information describing a current state of the vehicle 10 and a route planned for the vehicle 10, and, based on this information, to determine and optimize a trajectory for the vehicle 10. In some embodiments, the trajectory controller may output signals operable to control the vehicle 10 such that the vehicle 10 follows the trajectory that is determined by the trajectory controller. For example, the output of the trajectory controller can be an optimized trajectory that may be supplied to the powertrain 14, the wheels 18, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 18 may be a steered wheel, which may be pivoted to a steering angle under control of the steering unit 24, a propelled wheel, which may be torqued to propel the vehicle 10 under control of the transmission 22, or a steered and propelled wheel that may steer and propel the vehicle 10.

Although not shown in FIG. 1, a vehicle may include units, or elements, not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
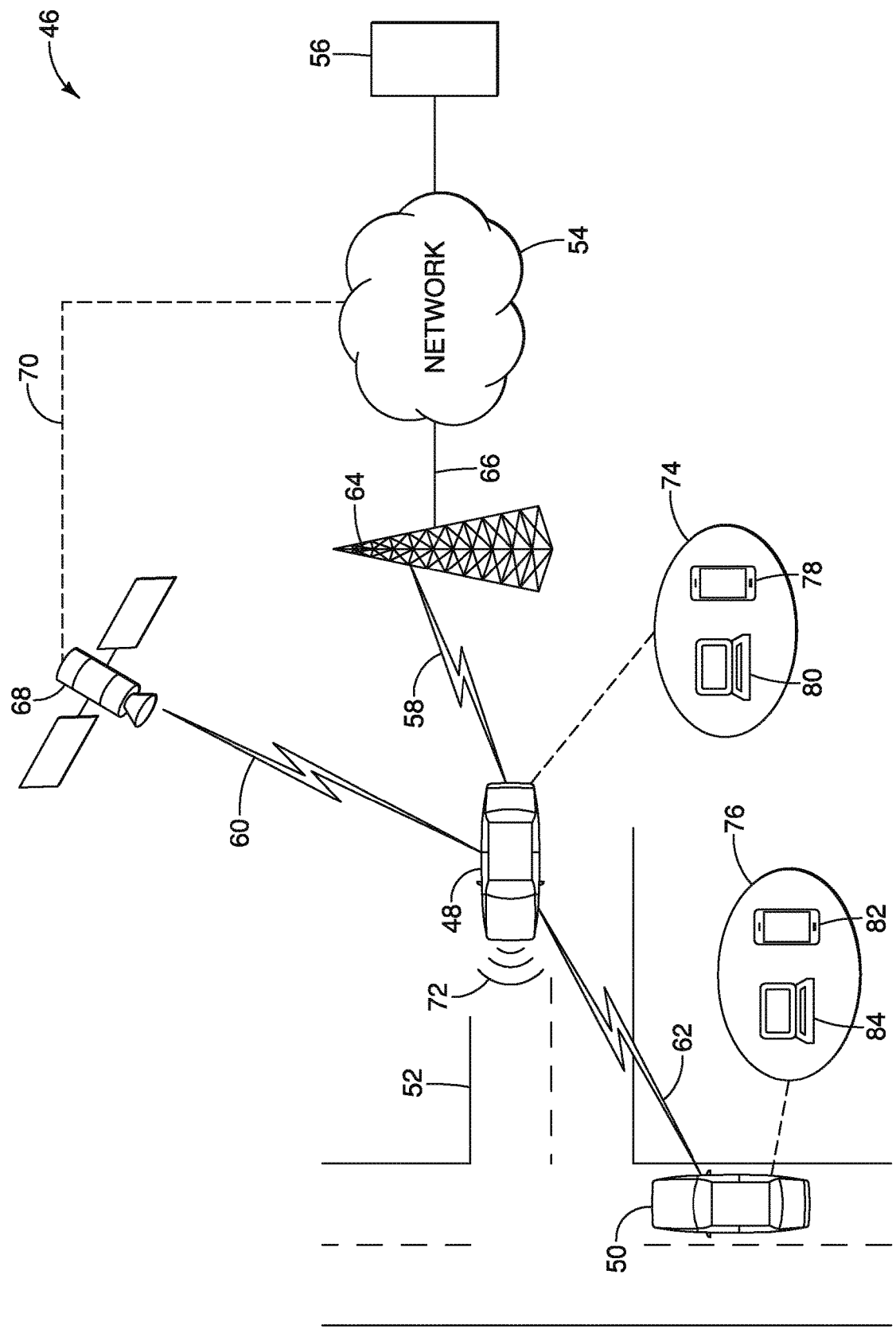
FIG. 2 is a diagram of a communication system of the vehicle of FIG. 1.

FIG. 2 is a diagram of an example of a portion of a vehicle transportation and communication system 46 in which the aspects, features, and elements disclosed herein may be implemented. The vehicle transportation and communication system 46 may include one or more vehicles 48 and 50, such as the vehicle 10 shown in FIG. 1, which may travel via one or more portions of one or more vehicle transportation networks 52, and may communicate via one or more electronic communication networks 54.

The electronic communication network 54 may be, for example, a multiple access system and may provide for communication, such as voice communication, data communication, video communication, messaging communication, or a combination thereof, between the vehicle 48/50 and one or more communication devices 56. For example, a vehicle 48/50 may receive information, such as information representing the vehicle transportation network 52, from a communication device 56 via the network 54.

In some embodiments, a vehicle 48/50 may communicate via a wired communication link (not shown), a wireless communication link 58/60/62, or a combination of any number of wired or wireless communication links. For example, as shown, a vehicle 48/50 may communicate via a terrestrial wireless communication link 58, via a non-terrestrial wireless communication link 60, or via a combination thereof. The terrestrial wireless communication link 58 may include an Ethernet link, a serial link, a Bluetooth link, an infrared (IR) link, an ultraviolet (UV) link, or any link capable of providing for electronic communication.

A vehicle 48/50 may communicate with another vehicle 48/50. For example, a host, or subject, vehicle (HV) 48 may receive one or more automated inter-vehicle messages, such as a basic safety message (BSM), from a remote, or target, vehicle (RV) 50, via a direct communication link 62, or via a network 54. For example, the remote vehicle 50 may broadcast the message to host vehicles within a defined broadcast range, such as 300 meters. In some embodiments, the host vehicle 48 may receive a message via a third party, such as a signal repeater (not shown) or another remote vehicle (not shown). A vehicle 48/50 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 48 may communicate with the communications network 54 via an access point 64. The access point 64, which may include a computing device, may be configured to communicate with a vehicle 48, with a communication network 54, with one or more communication devices 56, or with a combination thereof via wired or wireless communication links 58/66. For example, the access point 64 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 48 may communicate with the communications network 54 via a satellite 68, or other non-terrestrial communication device. The satellite 68, which may include a computing device, may be configured to communicate with a vehicle 48, with a communication network 54, with one or more communication devices 56, or with a combination thereof via one or more communication links 60/70. Although shown as a single unit in FIG. 2, a satellite may include any number of interconnected elements.

An electronic communication network 54 may be any type of network configured to provide for voice, data, or any other type of electronic communication. For example, the electronic communication network 54 may include a local area network (LAN), a wide area network (WAN), a virtual private network (VPN), a mobile or cellular telephone network, the Internet, or any other electronic communication system. The electronic communication network 54 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 48 may identify a portion or condition of the vehicle transportation network 52. For example, the vehicle 48 may include one or more on-vehicle sensors 72, such as sensor 38 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 52. The sensor data may include lane line data, remote vehicle location data, or both.

The vehicle 48 may traverse a portion or portions of one or more vehicle transportation networks 52 using information communicated via the network 54, such as information representing the vehicle transportation network 52, information identified by one or more on-vehicle sensors 72, or a combination thereof.

Although, for simplicity, FIG. 2 shows two vehicles 48, 50, one vehicle transportation network 52, one electronic communication network 54, and one communication device 56, any number of vehicles, networks, or computing devices may be used. The vehicle transportation and communication system 46 may include devices, units, or elements not shown in FIG. 2. Although the vehicle 48 is shown as a single unit, a vehicle may include any number of interconnected elements.

Although the vehicle 48 is shown communicating with the communication device 56 via the network 54, the vehicle 48 may communicate with the communication device 56 via any number of direct or indirect communication links. For example, the vehicle 48 may communicate with the communication device 56 via a direct communication link, such as a Bluetooth communication link.

In some embodiments, a vehicle 48/50 may be associated with an entity 74/76, such as a driver, operator, or owner of the vehicle. In some embodiments, an entity 74/76 associated with a vehicle 48/50 may be associated with one or more personal electronic devices 78/80/82/84, such as a smartphone 78/82 or a computer 80/84. In some embodiments, a personal electronic device 78/80/82/84 may communicate with a corresponding vehicle 48/50 via a direct or indirect communication link. Although one entity 74/76 is shown as associated with one vehicle 48/50 in FIG. 2, any number of vehicles may be associated with an entity and any number of entities may be associated with a vehicle.

Figure 3:
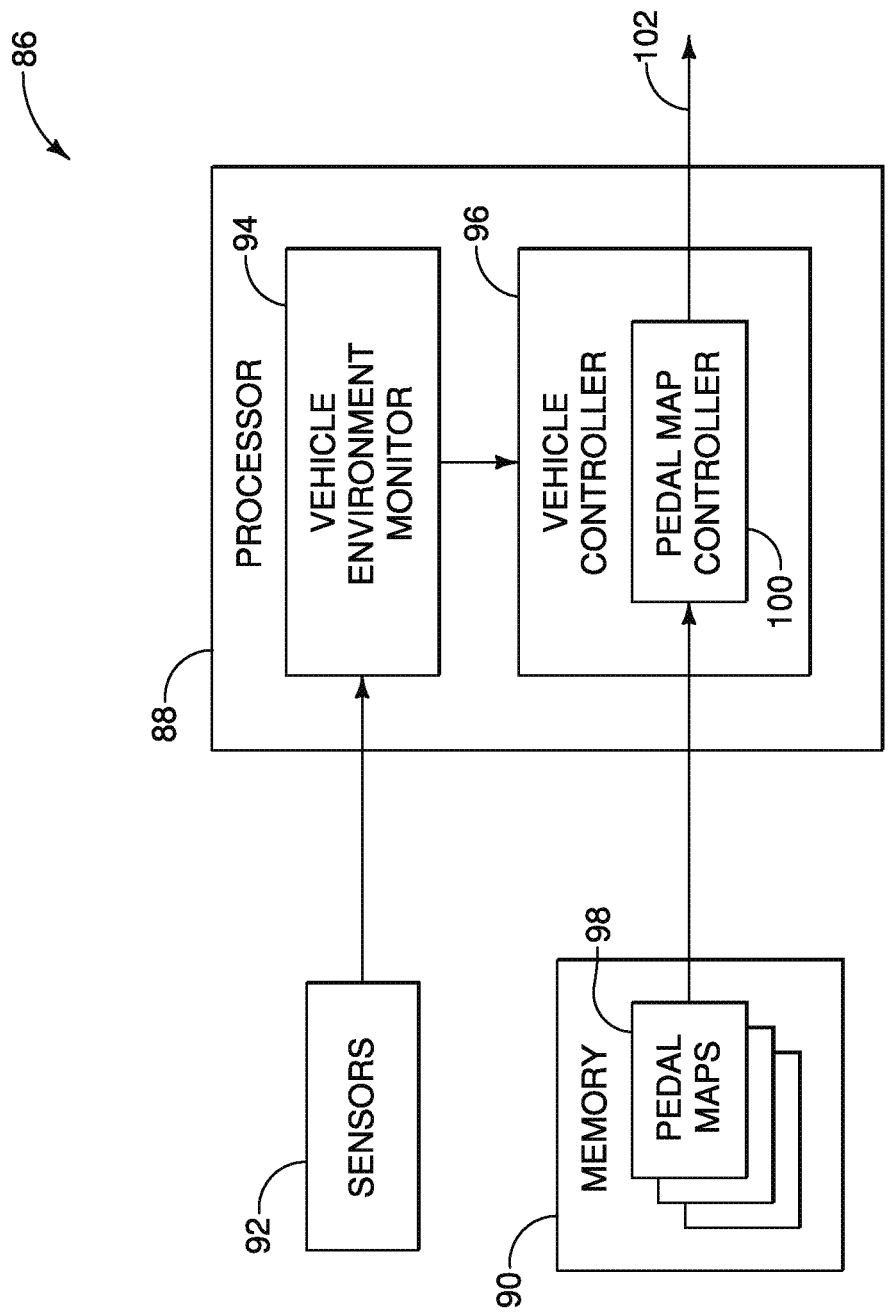
FIG. 3 is a diagram of a one-pedal control system for use in a vehicle in accordance with this disclosure.

FIG. 3 is a diagram of an example of a one pedal, or e-pedal, control system 86 for use in a vehicle in accordance with this disclosure. The one pedal control system 86 includes a processor 88, such as processor 32 shown in FIG. 1, a memory 90, such as memory 34 shown in FIG. 1, and one or more sensors 92, such as sensor 38 shown in FIG. 1. The one-pedal control system 86 allows the electric vehicle 10 (FIG. 1) to be operated with one pedal that controls accelerating and braking.

The processor 88 includes a vehicle environment monitor 94 and a vehicle controller 96. The vehicle environment monitor 94 may correlate, associate, or otherwise process the operational environment data to determine a scene, or scene understanding. Determining a scene may include identifying, tracking, or predicting actions of one or more remote vehicles in the operational environment of the electric vehicle, such as information indicating a slow or stationary remote vehicle along the expected path of the electric vehicle, to identify one or more aspects of the operational environment of the electric vehicle, such as vehicle transportation network geometry in the operational environment of the electric vehicle, or a combination thereof geospatially corresponding to a lane-change operation. For example, the vehicle environment monitor 94 may receive information, such as sensor data, from the one or more sensors 92, which may correspond to one or more remote vehicles in the operational environment of the electric vehicle, one or more aspects of the operational environment of the electric vehicle in the operational environment of the electric vehicle or a combination thereof geospatially corresponding to a scene, such as, for example, associated with a lane-change operation. The vehicle environment monitor 94 may associate the sensor data with one or more identified remote vehicles in the operational environment of the electric vehicle, one or more aspects of the operational environment of the electric vehicle, or a combination thereof geospatially corresponding to a lane-change operation, which may include identifying a current or expected direction of travel, a path, such as an expected path, a current or expected velocity, a current or expected acceleration rate, or a combination thereof, for one or more of the respective identified remote vehicles. The vehicle environment monitor 94 may output the identified, associated, or generated scene information to, or for access by, the vehicle controller 96. The scene information may classify vehicles as in-lane, neighbor-lane, on-coming, or other classification. An in-lane vehicle may be classified as a lead vehicle that the host vehicle has identified to follow. A neighbor-lane vehicle may be classified as a neighbor vehicle that is in a neighbor lane. A neighbor vehicle may be re-classified as a lead vehicle after the host vehicle performs or is performing a lane change into the neighbor lane. An on-coming vehicle is a vehicle that is traversing in a direction towards the host vehicle, and may be in the same lane as the vehicle or a neighbor lane.

The memory 90 includes one or more pedal maps 98. The pedal maps 98 may be referred to as accelerator maps and may be associated with driving modes, such as a normal mode, a regenerative mode, or a comfort mode. For example, a regenerative mode may provide a heavy deceleration (i.e., active braking) when the accelerator pedal is released, and a comfort mode may provide a minimal deceleration so as to provide a gliding experience when the accelerator pedal is released. A normal mode may be a blend of the regenerative mode and comfort mode where a moderate deceleration is provided. Each pedal map may be a representation of a method to convert the driver's accelerator pedal output (APO) to a driver torque request. A pedal map may be expressed as curves of torque versus speed and APO, and may be used to estimate a driver torque or acceleration request based on the driving mode, vehicle speed, and APO.

The vehicle controller 96 includes a pedal map controller 100 and is configured to receive the scene information from the vehicle environment monitor 94. The pedal map controller 100 is configured to modify a pedal map from the memory 90 based on the scene information. The pedal map controller 100 may output a pedal map change request 102. The pedal map change request 102 is based on a variance determined by an alternative pedal map running in the background (i.e., shadow mode), as described below.

The vehicle 10 is equipped with an accelerator pedal that is operated by a driver to modulate vehicle speed. An accelerator pedal output (APO) is a number from 0-100%. The vehicle uses a lookup table (APT), which is one of the pedal maps 98 stored in the memory 90 (FIG. 3). Based on the APO and the vehicle speed, the APT outputs a torque request, or vehicle acceleration. For vehicles using one-pedal control, the APT is configured to request very high deceleration values when the APO is 0% to provide one-pedal driving.

An APO mean/variance is a common metric analogous indicative of the ease of driving. A high pedal variance indicates more work is performed by the driver, while a low pedal variance indicates less work performed by the driver. Generally, the APT is tuned for a generic, or average, driving style. For a driver that drives differently from the generic driving style, the APO variance is large. The pedal control system in accordance with the present disclosure provides personalized, or customized, one-pedal tuning to modify the APO mean/variance to a target mean/variance value to maximize the ease of driving with vehicle with one-pedal control.

A shadow mode estimates an APO variance based on using the alternate APT's (e.g., APT1, APT2, or APT3). The one-pedal control system then selects the alternate APT that matches the target APO mean/variance. A shadow mode is a system that works passively in the background using actual data for inputs.

Figure 4:
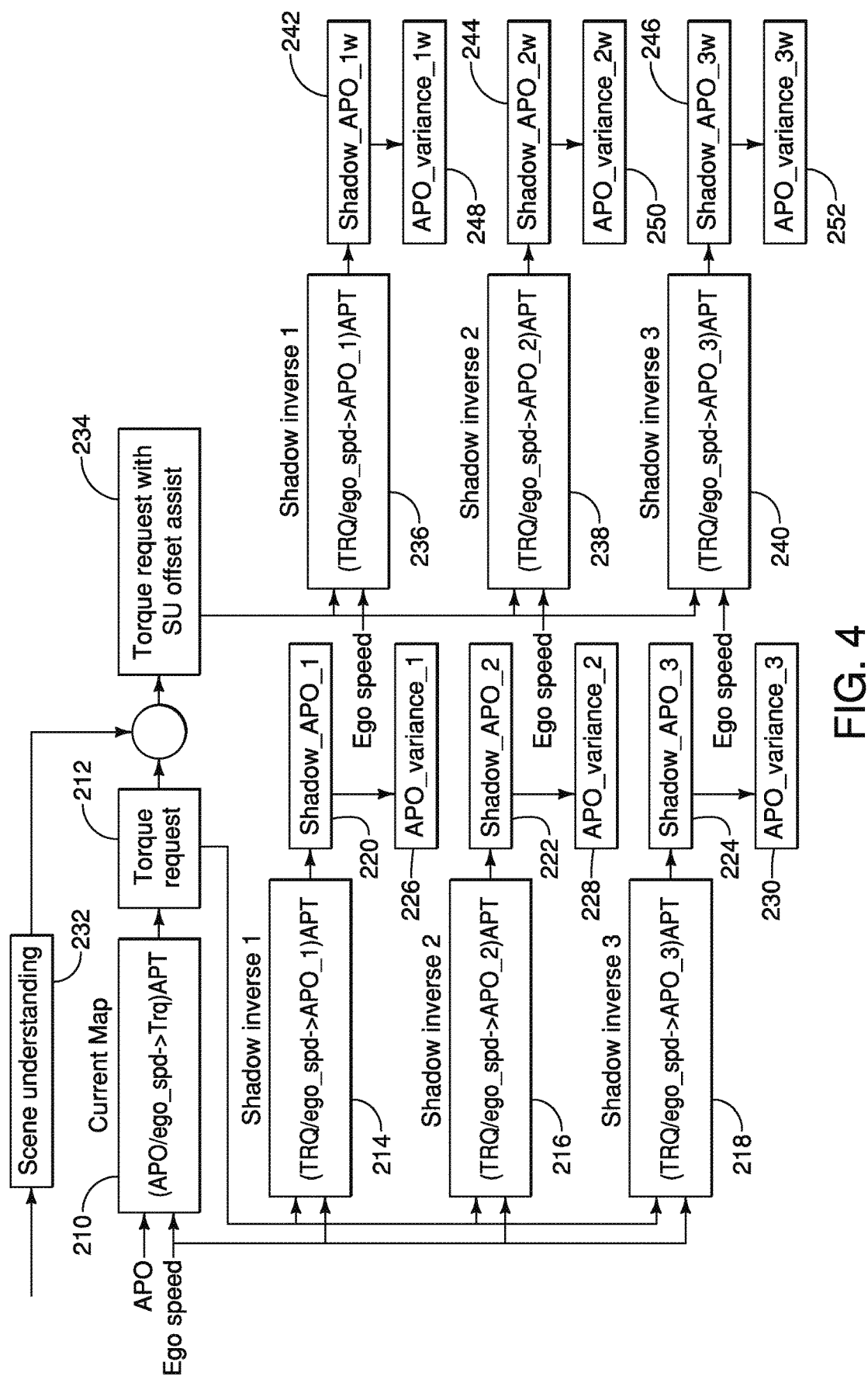
FIG. 4 is a flowchart of the one-pedal control system.
Figure 5:
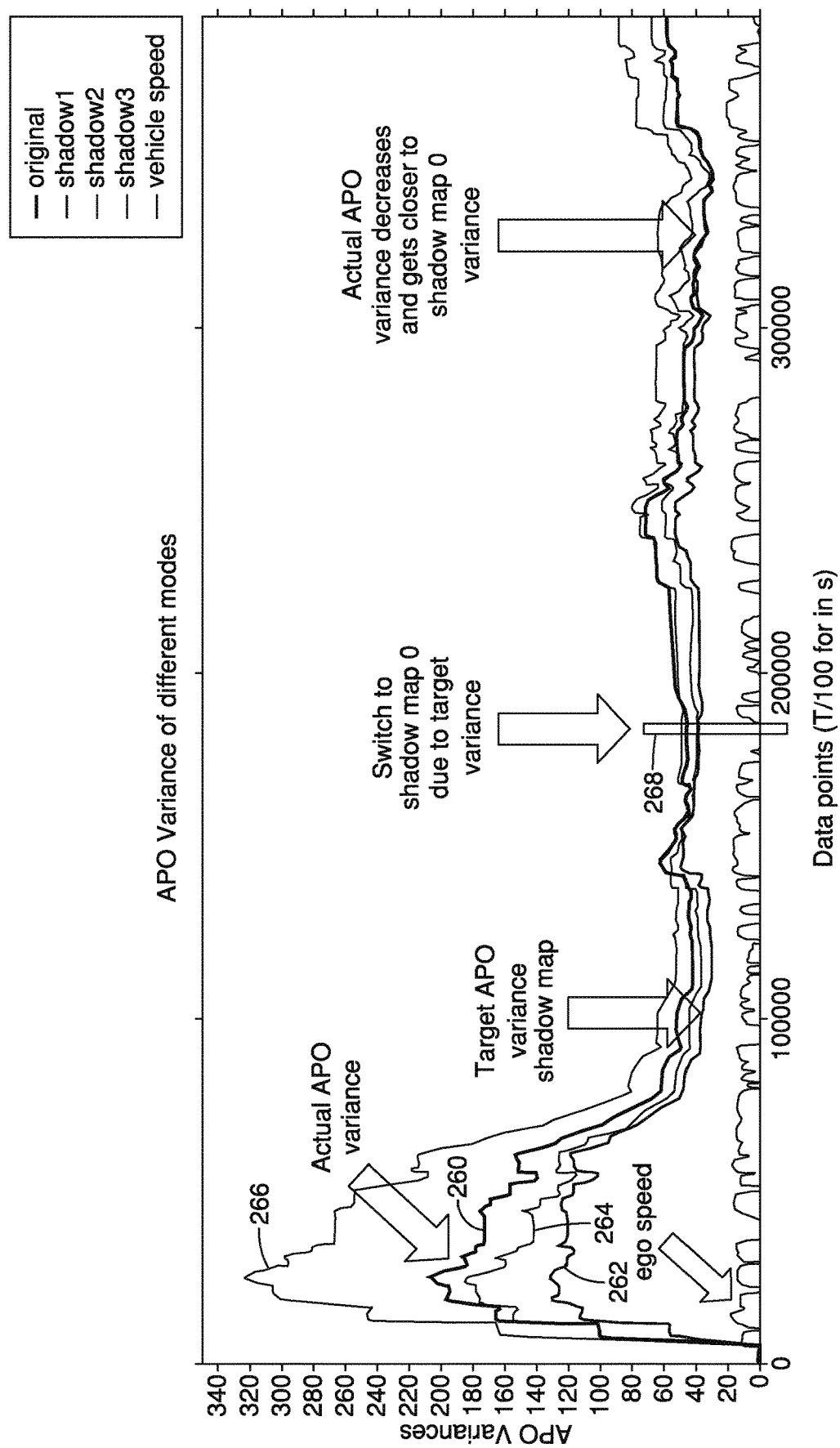
FIG. 5 is a graph of accelerator pedal output (APO) variance in different drive modes.

In the one-pedal control system shown in FIGS. 4 and 5, the vehicle 10 (FIG. 1) is operated in accordance with a current pedal map (APT) 210 in step S10. The current pedal map 210 is one of the pedal maps 98 stored in the memory 90 (FIG. 3). The process continues to step S20 in which a plurality of alternative APT's (pedal maps) are defined. The process continues to step S30 in which a variance for each of the plurality of alternative pedal maps is determined. The process moves to step S40 in which the current APT is switched to one of the alternative APT based on the determined variance resulting in the target APO mean/variance.

In step S20, the plurality of alternative APT's is defined. For example, a first alternative APT, i.e., APT1, is defined for an aggressive driver. A third alternative APT, i.e., APT3, is defined for a conservative driver. A second alternative APT, i.e., APT2, is defined for a driver between an aggressive and conservative driving style, but different from the current pedal map APT. The alternative APT's for the vehicle can be determined by conventional testing.

In step S30, the variance for each of the plurality of alternative pedal maps is determined. In vehicles equipped with one-pedal driving, the driver gradually adjusts to how the accelerator pedal output (APO) is converted to a torque request to achieve a desired speed. The conversion from the APO and the vehicle speed to the torque request is designed or tuned based on the current APT for a generic driving style. By learning how a driver drives in different situations and conditions, the pedal map (APT) that converts the APO and the vehicle speed to the torque request can be tuned on the go as desirable to the style of driving of the driver with the one-pedal control system of the present disclosure.

As shown in FIG. 4, a plurality of shadow APTs, or alternative pedal maps, are working in the background of the current APT 210. The current APT 210 receives the APO and the vehicle speed as inputs. The current APT 210 converts the APO and the vehicle speed (APO/ego_spd) to a torque request 212 to be output. As shown in the current pedal map 210, the APO and vehicle speed (ego_spd) are inputs, and torque (trq) is output by the map (APT).

An inverse shadow APT, or inverse alternative pedal map, 212, 214 and 216 is generated for each shadow APT. Each shadow APT receives the torque request 212 and the vehicle speed as inputs and outputs a shadow APO 220, 222 and 224 based on the defined alternative pedal maps, and determines an APO variance 226, 228 and 230, respectively. The variance outputs 226, 228 and 230 of the inverse shadow APT's 214, 216 and 218, respectively, are compared to the outputs of the existing shadow APT's (APO variance) to classify the driving style of the driver. The variance 226, 228 and 230 for each of the plurality of inverse alternative pedal maps 214, 216 and 218 is compared to a variance for each of the respective plurality of alternative pedal maps. When sufficient data is received, one of the shadow APT's can replace the current pedal map 210, as shown in step S40.

Multiple shadow APT's can be analyzed in place of the current APT 210 in different scenarios. Using a navigation map, such as the location unit 28 in FIG. 1, different shadow APT's can be analyzed based on driving styles on different types of roads. With scene understanding 232 around the vehicle, an offset can be added to the torque input 212 to generate a torque request including a scene understanding (SU) offset assist 234. The torque request with the scene understanding offset 234 and the vehicle speed are input to the plurality of inverse shadow APT's, as shown in FIG. 4. This allows different APT's to be tuned to the driver preference of relative speed and/or distance to the vehicles around the vehicle by including the scene understanding.

As shown in FIG. 4, a plurality of shadow APTs are working in the background of the current APT 210. The current APT 210 receives the APO and the vehicle speed as inputs. The current APT 210 converts the APO and the vehicle speed (APO/ego_spd) to a torque request 212 to be output. A scene understanding offset based on the scene understanding is added to the torque request 212 to generate a torque request with scene understanding offset 234. The scene associated with an operational environment of the vehicle is obtained using sensor data, such as sensors 92 (FIG. 3). The sensor data used to determine the scene includes at least one of a relative speed of the vehicle with respect to another vehicle in the vicinity and a distance from the vehicle to the other vehicle in the vicinity.

An inverse shadow APT, or inverse alternative pedal map, 236, 238 and 240 is generated for each of the plurality of alternative pedal maps, or shadow APT's, using scene understanding. Each shadow APT, or inverse alternative pedal map, receives the torque request with scene understanding offset 234 and the vehicle speed as inputs, and outputs a shadow APO 242, 244 and 246 based on the defined alternative pedal maps, and determines an APO variance 248, 250 and 252, respectively. The variance outputs 248, 250 and 252 of the inverse shadow APT's 236, 238 and 240, respectively, are compared to the outputs of the existing shadow APT's (APO variance) to classify the driving style of the driver. The variance 248, 250 and 252 for each of the plurality of inverse alternative pedal maps 236, 238 and 240 is compared to a variance for each of the respective plurality of alternative pedal maps. When sufficient data is received, one of the shadow APT's can replace the current pedal map 210, as shown in step S40.

Figure 6:
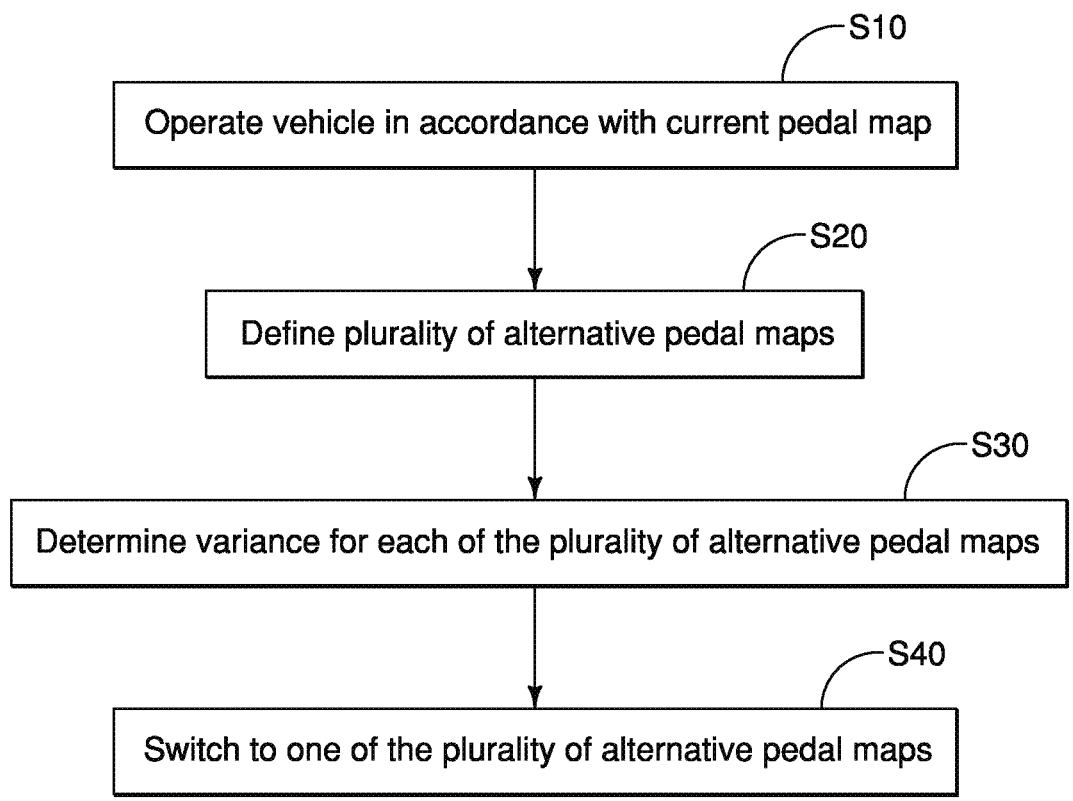
FIG. 6 is a flowchart illustrating changing of a pedal map.

The current pedal map 210 is switched to one of the alternative pedal maps, as shown in FIG. 4 and step S40 of FIG. 6. The current pedal map 210 is switched to the one of the alternative pedal maps having the smallest variance. The variance is determined over a predetermined period of time. As shown in FIG. 5, a plurality of variances determined over time are illustrated. An APO variance corresponding to the current pedal map 210 is illustrated by line 260 (original). An APO variance corresponding to a first alternative pedal map (using the first inverse alternative pedal map 214) is illustrated by line 262 (shadow 1). An APO variance corresponding to a second alternative pedal map (using the first inverse alternative pedal map 216) is illustrated by line 264 (shadow 2). An APO variance corresponding to a third alternative pedal map (using the first inverse alternative pedal map 218) is illustrated by line 266 (shadow 3). The vehicle speed is indicated by ego speed. At a predetermined time 268 of 2000 seconds (roughly 33 minutes), the variance of line 262 (shadow 1) has the smallest variance. Accordingly, the current pedal map 210 is switched to the alternative pedal map corresponding to the first alternative pedal map. The pedal map controller 100 (FIG. 3) seamlessly changes the current pedal map 210 to the pedal map determined to have the smallest variance. The one-pedal system is personalized for different driving styles for the driver, thereby providing an easier driving experience.

Alternatively, telemetry data from the vehicle can be transmitted over the network 54 (FIG. 2) such that the shadow APT's can be tested remotely. The vehicle APT's can be adjusted based on the remote testing using the transmitted telemetry data. Additionally, the APT's associated with different driving modes, such as eco, standard, and sport, can be tuned remotely based on the transmitted telemetry data. The APT's are tuned remotely and transmitted to the vehicle for use to provide an easier driving experience in a vehicle with a one-pedal system.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above". "downward", "vertical", "horizontal", "below" and "transverse" as well as any other similar directional terms refer to those directions of an electric vehicle equipped with the pedal control system and method. Accordingly, these terms, as utilized to describe the present invention should be interpreted relative to an electric vehicle equipped with the pedal control system and method.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of controlling an electric vehicle comprising:

operating the vehicle in accordance with a current pedal map;

defining a plurality of alternative pedal maps;

determining a variance for each of the plurality of alternative pedal maps; and switching operation of the vehicle from the current pedal map to one of the alternative pedal maps based on the determined variance.

2. The method according to claim 1, further comprising determining an inverse alternative pedal map for each of the plurality of alternative pedal maps, each of the inverse alternative pedal maps being based on a vehicle speed, a torque request based on the current pedal map, and the respective alternative pedal map.

3. The method according to claim 2, wherein the variance for each of the plurality of inverse alternative pedal maps is compared to a variance for each of the respective plurality of alternative pedal maps.

4. The method according to claim 1, further comprising obtaining sensor data to determine a scene associated with an operational environment of the vehicle.

5. The method according to claim 4, further comprising determining an inverse alternative pedal map for each of the plurality of alternative pedal maps, each of the inverse alternative pedal maps being based on a vehicle speed, a torque request based on the current pedal map and the scene, and the respective alternative pedal map.

6. The method according to claim 4, further comprising the sensor data used to determine the scene includes at least one of a relative speed of the vehicle with respect to another vehicle in the vicinity and a distance from the vehicle to the other vehicle in the vicinity.

7. The method according to claim 1, wherein the current pedal map is switched to the one of the alternative pedal maps having the smallest variance.

8. The method according to claim 1, wherein the variance is determined over a predetermined amount of time.

9. The method according to claim 2, wherein a torque offset is added to the torque request to determine the alternative inverse pedal map.

10. The method according to claim 1, further comprising operating the vehicle with a pedal that controls accelerating and braking.

11. The method according to claim 10, wherein the current pedal map outputs a torque request based on a vehicle speed and an accelerator pedal output of the pedal.

12. A pedal control system for an electric vehicle, comprising:
- a pedal configured to control acceleration and braking of the vehicle;
- a memory configured to store a current pedal map; and
- an electronic controller configured to output a torque request based on a vehicle speed, an accelerator pedal output of the pedal, and the current pedal map, the controller being further configured to
  - define a plurality of alternative pedal maps;
  - determine a variance for each of the plurality of alternative pedal maps; and
  - switch operation of the vehicle from the current pedal map to one of the alternative pedal maps based on the determined variance.

13. The pedal control system according to claim 12, the controller is further configured to determine an inverse alternative pedal map for each of the plurality of alternative pedal maps, each of the inverse alternative pedal maps being based on a vehicle speed, a torque request based on the current pedal map, and the respective alternative pedal map.

14. The pedal control system according to claim 13, wherein the variance for each of the plurality of alternative pedal maps is determined based on the respective inverse alternative pedal map.

15. The pedal control system according to claim 12, wherein a sensor is configured to obtain sensor data to determine a scene associated with an operational environment of the vehicle.

16. The pedal control system according to claim 15, wherein the controller is further configured to determine an inverse alternative pedal map for each of the plurality of alternative pedal maps, each of the inverse alternative pedal maps being based on a vehicle speed, a torque request based on the current pedal map and the scene, and the respective alternative pedal map.

17. The pedal control system according to claim 15, wherein the sensor data obtained by the sensor and used to determine the scene includes at least one of a relative speed of the vehicle with respect to a vehicle in the vicinity and a distance from the vehicle to a vehicle in the vicinity.

18. The pedal control system according to claim 12, wherein the current pedal map is switched to the one of the alternative pedal maps having the smallest variance.

19. The pedal control system according to claim 12, wherein the variance is determined over a predetermined amount of time.

20. The pedal control system according to claim 13, wherein a torque offset is added to the torque request to determine the alternative inverse pedal map.

* * * * *